Dec. 2, 1958     T. L. DIMOND     2,862,671
AUTOMATIC WIRING SYSTEM AND APPARATUS
Filed July 24, 1953     10 Sheets-Sheet 1

INVENTOR
T. L. DIMOND
BY John C. Morris
ATTORNEY

Dec. 2, 1958 T. L. DIMOND 2,862,671
AUTOMATIC WIRING SYSTEM AND APPARATUS
Filed July 24, 1953 10 Sheets-Sheet 2
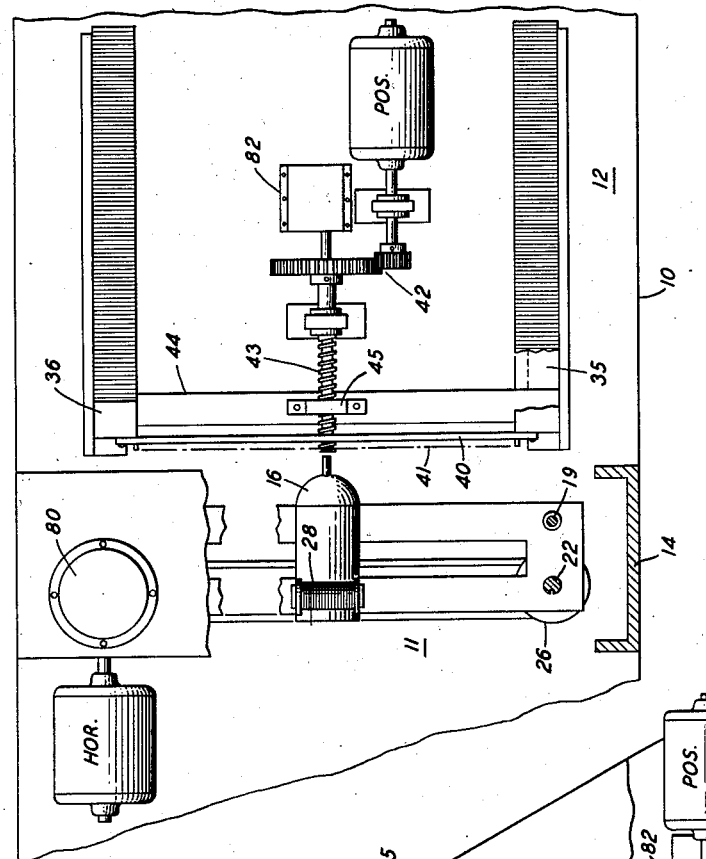
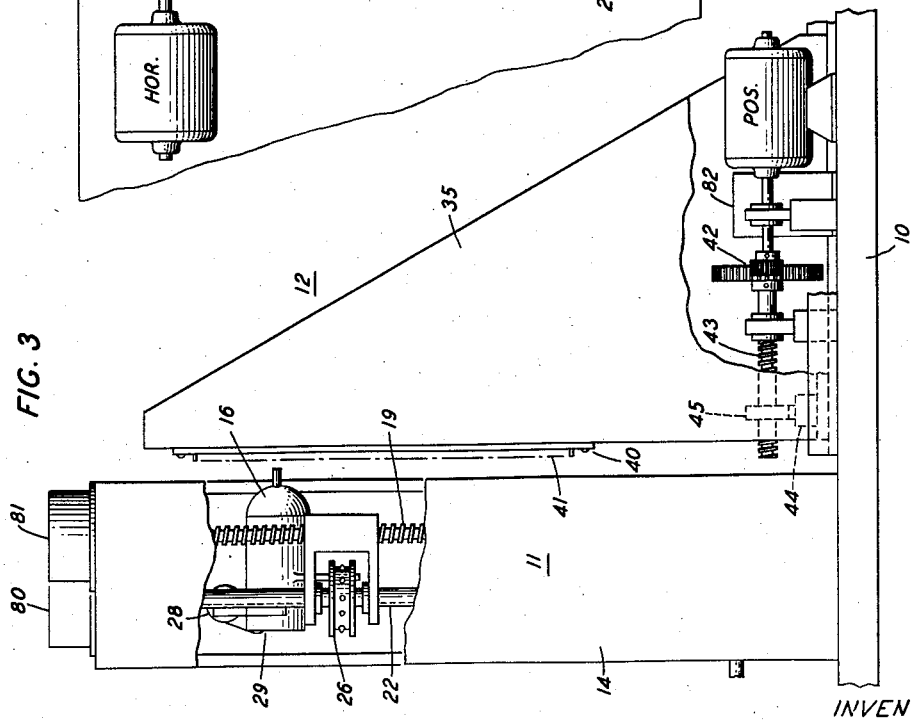
INVENTOR
T. L. DIMOND
BY John C. Morris
ATTORNEY Dec. 2, 1958 T. L. DIMOND 2,862,671
AUTOMATIC WIRING SYSTEM AND APPARATUS
Filed July 24, 1953 10 Sheets-Sheet 3
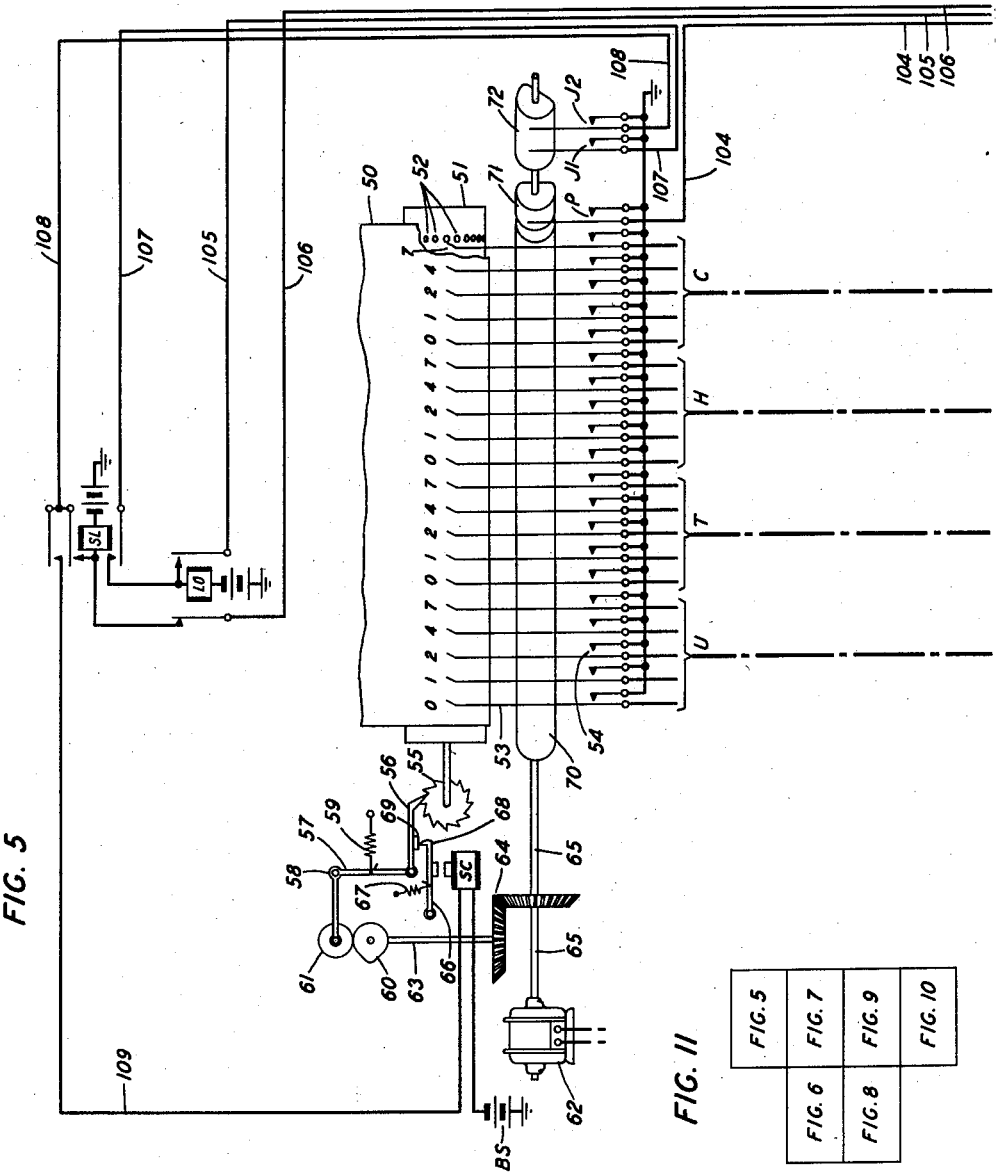
INVENTOR
T. L. DIMOND
BY
John C. Morris
ATTORNEY INVENTOR
T. L. DIMOND
BY John C. Morris
ATTORNEY Dec. 2, 1958　　　　　T. L. DIMOND　　　　2,862,671
AUTOMATIC WIRING SYSTEM AND APPARATUS
Filed July 24, 1953　　　　　　　　　10 Sheets-Sheet 5

INVENTOR
T. L. DIMOND
BY
John C. Moris
ATTORNEY

Dec. 2, 1958 — T. L. DIMOND — 2,862,671
AUTOMATIC WIRING SYSTEM AND APPARATUS
Filed July 24, 1953 — 10 Sheets-Sheet 7

INVENTOR
T. L. DIMOND
BY John C. Morris
ATTORNEY

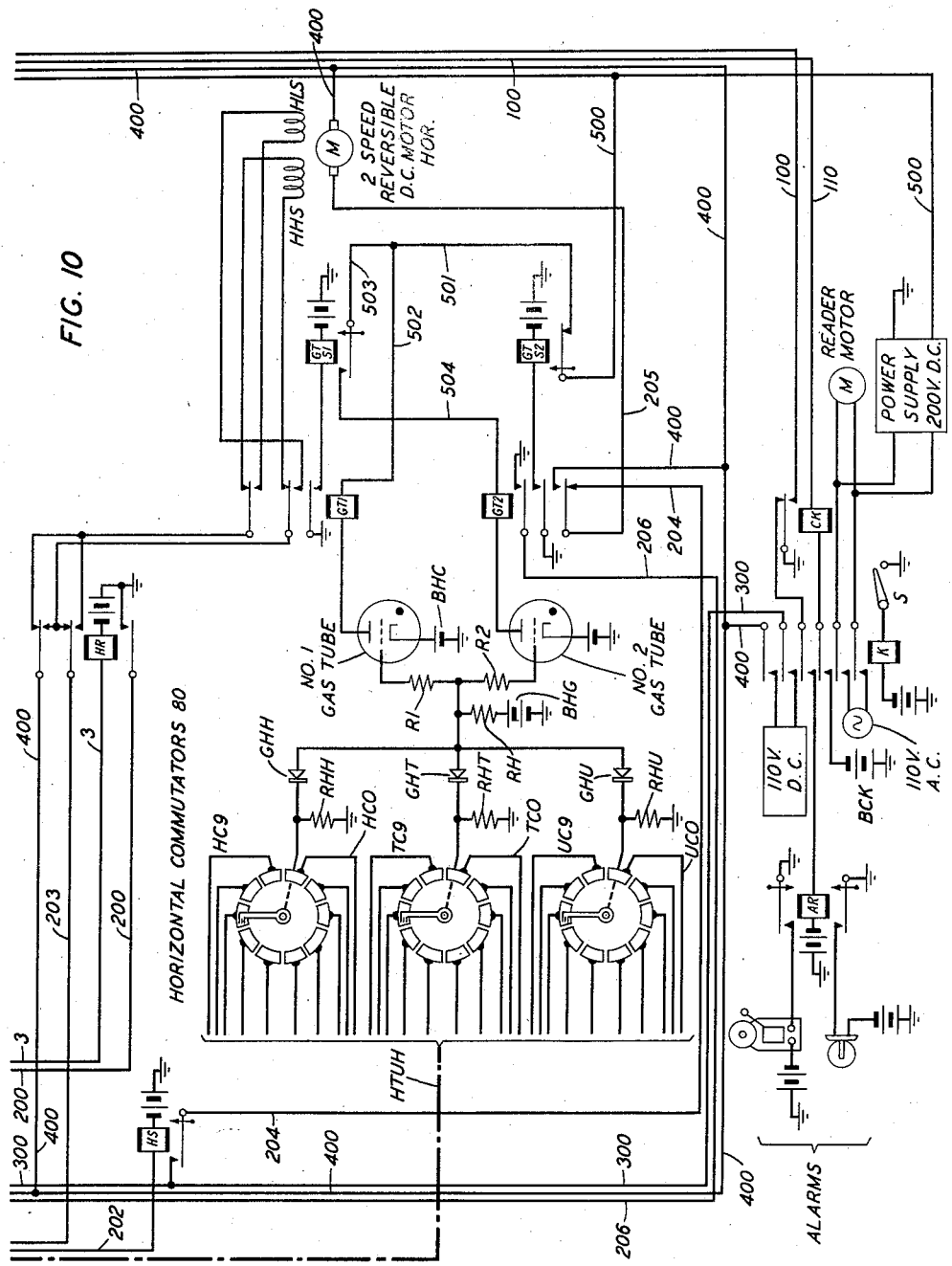

Dec. 2, 1958 T. L. DIMOND 2,862,671
AUTOMATIC WIRING SYSTEM AND APPARATUS
Filed July 24, 1953 10 Sheets-Sheet 9
*FIG. 12*
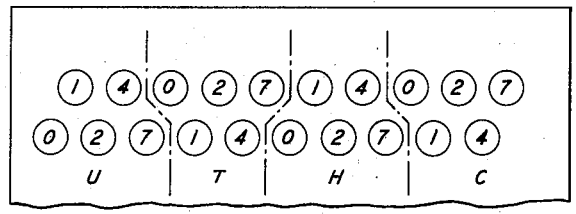
*FIG. 13*
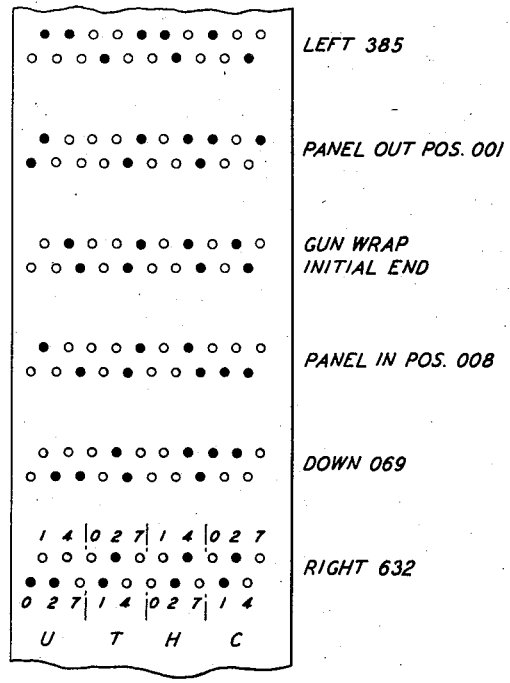
*FIG. 15*
| DECIMAL DIGIT | CODE ELEMENTS |
|---|---|
| 1 | 0-1 |
| 2 | 0-2 |
| 3 | 1-2 |
| 4 | 0-4 |
| 5 | 1-4 |
| 6 | 2-4 |
| 7 | 0-7 |
| 8 | 1-7 |
| 9 | 2-7 |
| 0 | 4-7 |
*FIG. 16*
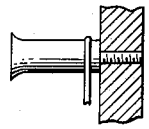
INVENTOR
*T. L. DIMOND*
BY
*John C. Morris*
ATTORNEY Dec. 2, 1958  T. L. DIMOND  2,862,671
AUTOMATIC WIRING SYSTEM AND APPARATUS
Filed July 24, 1953  10 Sheets-Sheet 10
FIG. 14
COMMAND CODE
| HOLES PUNCHED | DECIMAL DIGIT | COMMAND GIVEN |
|---|---|---|
| 0-1 | 1 | UP |
| 0-2 | 2 | DOWN |
| 1-2 | 3 | RIGHT |
| 0-4 | 4 | LEFT |
| 1-4 | 5 | PANEL IN |
| 2-4 | 6 | GUN WRAP INITIAL END |
| 0-7 | 7 | PANEL OUT |
| 1-7 | 8 | GUN WRAP FINAL END |
FIG. 17
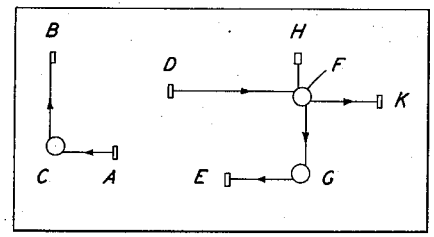
FIG. 18
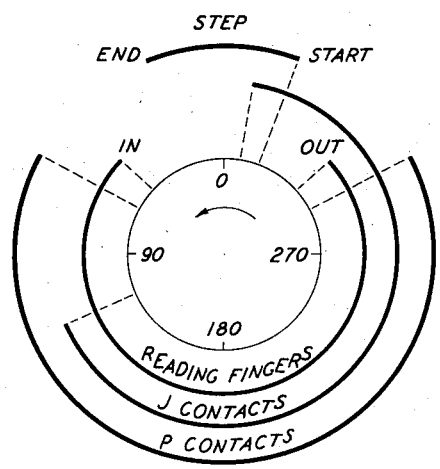
INVENTOR
T. L. DIMOND
BY John C. Morris
ATTORNEY

United States Patent Office 2,862,671
Patented Dec. 2, 1958

2,862,671
AUTOMATIC WIRING SYSTEM AND APPARATUS

Thomas L. Dimond, Rutherford, N. J., assignor to Bell Telephone Laboratories, Incorporated, New York, N. Y., a corporation of New York Application July 24, 1953, Serial No. 370,148

11 Claims. (Cl. 242—7)

This invention relates to wiring systems and, more particularly, to a coordinated system of controlled machinery for connecting wires between the terminals of a mounted array of electrical apparatus units.

The electrical interconnection of a plurality of apparatus units mounted on a rack or panel has heretofore required for each interconnection the services of an operator to cut to length, and to skin or strip the ends of an insulated wire, to secure the ends to terminals, and to solder both connections. Improvements have been realized by the use of wire wrapping tools that will rapidly wrap a skinned wire around a terminal, either as a prelude to soldering or in an electrically and structurally satisfactory joint requiring no solder. A hand operated tool of this type is disclosed in patent 2,585,010 of Hickman, Mallina and Reck, issued February 12, 1952. Other similar tools, such as that disclosed in the application of Frank Reck, Serial No. 234,643, filed June 30, 1951, now Patent 2,743,502, issued May 1, 1956 will cut, strip and wrap the end of a wire around a terminal.

Another wiring tool disclosed in the copending application of J. J. Madden, Serial No. 370,057, filed July 24, 1953, now Patent 2,696,656, issued December 14, 1954, may be used to strip an initial end of a wire and to wrap it on a terminal; and then without reloading, be carried to the other terminal to strip and connect the final end of the wire to this terminal.

An object of this invention is to facilitate the interconnection of designated terminals of a plurality of units of electrical apparatus suitably mounted on a rack, panel or like structure.

A more specific object of this invention is to carry out a complete wiring program for a mounted group of apparatus units by a suitably controlled machine.

A feature of this invention resides in a wiring machine including a wire wrapping tool or wiring gun, means for moving the tool to any one of a plurality of preselected positions in a coordinate system, and means for inserting the terminal at this position into the tool for connecting one end of a wire to said terminal; and then carrying the other end of the wire to another selected terminal and connecting it thereto; all of these means being under the control of a programming device.

A more specific feature lies in an assemblage comprising a base on which is mounted an apparatus panel supporting means, a wiring tool, and a wiring tool positioning means; the panel supporting means being operable to move the terminals of panel mounted apparatus units into and out of a wiring plane; and the wiring tool positioning means being operable to move the tool along prescribed paths to a position in the wiring plane opposite a particular apparatus terminal, all under the control of a code directed sensing means.

Another feature involves wire restraining means secured to a panel or rack to be wired, for aiding in the directing of a wire from one coordinate axis to the other.

Other and further objects and features of this invention will appear more fully and clearly from the following description of an illustrative embodiment thereof taken in connection with the appended drawings in which:

Fig. 3 is a view in side elevation of the tool positioning means of Fig. 1, and a cooperating panel positioning means, parts being broken away to show details;

Fig. 4 is a plan view, partly in section, of the means shown in Fig. 3;

Figure 1:
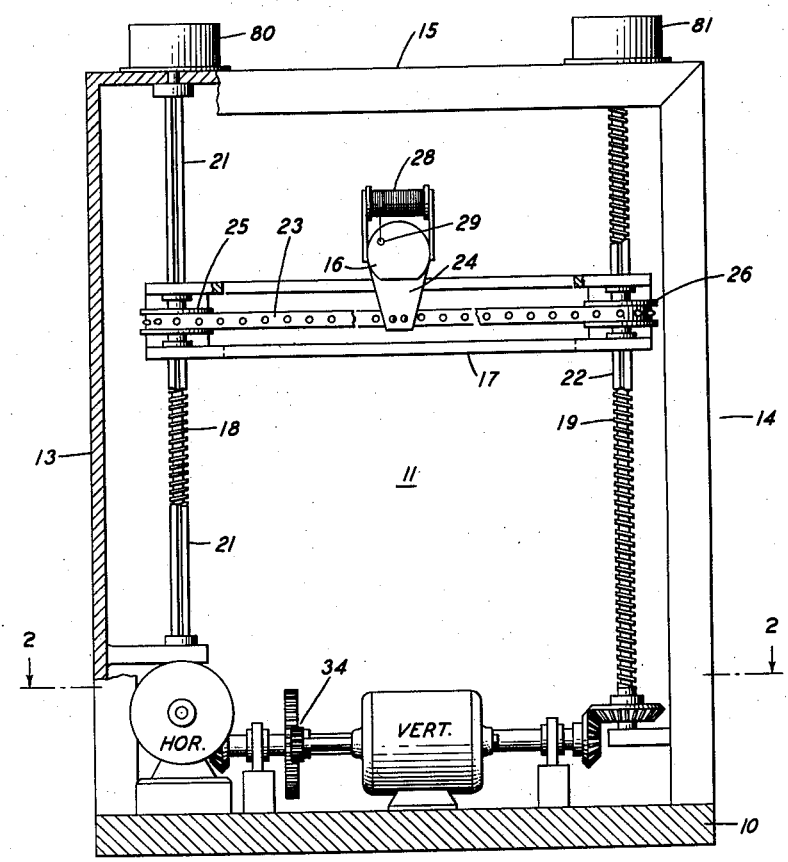
Fig. 1 is a partially sectioned elevational view of a wiring tool and tool positioning means embodying the invention.
Figure 2:
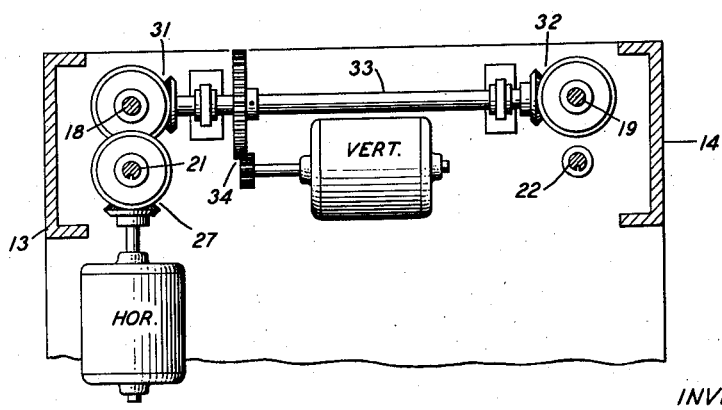
Fig. 2 is a section taken on the line of 2—2 of Fig. 1.

Figs. 5 to 10, inclusive, comprise a wiring diagram of the wiring system and its control means, the figures being related as shown on Fig. 11;

Fig. 12 is an illustration of a "line" of punched code used in the control means;

Fig. 13 shows a section of record tape with "lines" of illustrative commands;

Fig. 14 is a table of commands that may be used with corresponding code indications;

Fig. 15 shows the relation between 2 out of 5 code elements and corresponding decimal digits;

Fig. 16 is a view of a section of panel with a guide pin inserted therein;

Fig. 17 is a diagrammatic illustration of how guide pins may be used to aid in directing wires along desired paths; and Fig. 18 is a time diagram to show reader cam sequence operation.

As depicted in Figs. 1 to 4, inclusive, an illustrative wiring machine according to this invention comprises a base 10 on which is mounted a wiring tool positioning means generally designated as 11, and a panel supporting and positioning means generally designated as 12. The wiring tool or gun positioning means 11 is supported on one end of the base 10 by the base and by a structure projecting above the base and comprising parallel vertical channel members 13 and 14, and a channel cross member 15.

The wiring tool 16 is mounted on the carriage 17, which is driven vertically by screws 18 and 19 and guided by spline shafts 21 and 22. The tool 16 is mounted for horizontal movement along the carriage 17 and is driven by a perforated belt or tape 23 to which it is secured by the projection 24. The belt or tape 23 passes over pulleys 25 and 26 mounted respectively on the spline shafts 21 and 22. The pulleys 25 and 26 are free to slide along their respective shafts, but are splined to the shafts for rotation therewith. Around the periphery of each pulley is a series of spaced pins for cooperation with the perforations in the tape 23, to prevent slippage and to insure proper registration of the wiring tool. The spline shaft 21 is driven by a horizontal drive motor HOR through bevel gearing 27. A storage means for connecting wire is arranged to feed wire to the wiring tool as required. This may be done by means of a spool of wire 28 mounted on the wiring tool with the wire feeding into the tool through an orifice as at 29.

The screws 18 and 19, which drive the carriage 17 vertically, are respectively right and lefthanded in pitch, and are driven through bevel gearing means 31 and 32 on the oppsite ends of the shaft 33. The vertcial drive motor VERT drives the shaft 33 through spur gearing 34.

The panel supporting and positioning means 12 is provided with side members 35 and 36, which support a frame 40 for holding a panel 41 (indicated by a dot-dash line), which is to be wired. The panel supporting means may be provided with runners and guides upon which it may be moved toward and from the wiring tool 16. The panel supporting means is moved by the positioning motor POS through gearing 42 and screw 43. The cross member 44 of the positioning means is provided with a nut 45 for cooperating with the screw 43.

Illustrated in Figs. 1 and 3 is a three-section commutator 80 mounted on the cross member 15 for cooperation with the horizontal gun positioning control means. This commutator is driven by the spline shaft 21. A similar three-section commutator 81 for cooperation with the vertical gun positioning control means is also mounted on the member 15 and is driven by the screw 19. A single section commutator 82 is mounted on the base 10 in the area of the panel positioning means and is driven along with the screw 43.

The commutator sections each have ten different positions corresponding to the usual decimal system of numbering. The horizontal and vertical control commutators have suitably interconnected units, tens and hundreds sections, so that digital combinations from 000 to 999 may be handled, providing for high accuracy of wiring tool positioning. A units section only is sufficient for the panel positioning means, which moves only a short distance. The functions of these commutators will be discussed in greater detail in connection with a description of the control means and its operation.

The control system comprises a reader control means for the positioning, and the wrapping tool motors; and suitable interconnecting circuits including relays, switches, electrical valves, alarm means, and the like as will appear in the subsequent description.

The reader chosen for this illustrative embodiment of the invention is a modification of a reader used in automatic message accounting systems employed for recording telephone call information. A reader of this type is described and illustrated in an article entitled the "AMA Reader" published in the Bell Laboratories Record, volume XXX, No. 6, June 1952, pages 237 to 243, inclusive. Other types of readers in which the predetermined wiring information is recorded on perforated tape, as in the AMA Reader, or on punched cards, magnetic tape or wire, may be used if desired.

A schematic representation of the chosen reader is shown in Fig. 5. A tape 50 perforated with a suitable code passes over a roller 51. The code punchings are not shown in Fig. 5 but are illustrated in Figs. 12 and 13. The roller is provided with spaced orifices, a few of which are shown at 52 in Fig. 5. The reader fingers 53 are periodically moved toward the tape and the roller, under control of the cam 70, continuously driven from the motor shaft 65; and enter an orifice 52 whenever there is a corresponding perforation in the tape. Associated with each finger 53 is a contact pair 54, the contacs of which close when the corresponding finger enters an orifice 52. The perforations are grouped in accordance with a 2-out-of-5 code, which will be explained in connection with Figs. 12, 13, and 15.

The roller 51 is advanced step by step to allow the operations commanded by each line of code to be performed. The stepping means comprises a ratchet wheel 55 and a driving pawl 56 operated by a bell crank 57 pivoted at 58. The bell crank is biased by the spring 59 in a direction to drive the ratchet wheel through the pawl 56. The bell crank 57 is moved to retract the pawl 56 by means of the cam 60 through the follower 61 mounted on the bell crank. The cam 60 is driven continuously by the motor 62 to which it is coupled through the shaft 63, the gearing 64 and the motor shaft 65. The stepping operation is controlled by the stepping magnet SC through an interposer or holding means 66. The interposer 66 is biased toward the pawl 56 by the spring 67. When the stepping magnet SC is de-energized, the hook 68 on the interposer 66 engages the projection 69 on the pawl 56 to retain the pawl in retracted position, notwithstanding the continuous rotation of the cam 60. Energization of the stepping magnet SC releases the pawl 56 and allows advancement of the ratchet wheel 55 and thus the roller 51 when the cam 60 permits. Further details of stepping magnet operation will be discussed subsequently.

Mounted on the motor shaft 65 in addition to the cam 70, are the cams 71 and 72, which respectively operate the contacts P and the contacts J1 and J2. The function of these contacts will appear in the circuit description.

The reader contacts 54 are divided into groups of five due to the use of a 2-out-of-5 code. The groups reading from the left in Fig. 5 are units (U), tens (T), and hundreds (H), and command or operation (C). The U, T and H groups provide a position number for the wiring tool and for the panel. The C group provides commands such as up, down, right, left, etc. as shown by the table, Fig. 14, a decimal number being provided for each command required.

The record from which the various commands are given to the wiring machine comprises, as previously indicated, a perforated or punched tape. The code information comprising each command is arranged in a "line" across the tape, one "line" being brought under the reading fingers by each operation of the stepping means. In readers of this type a "line" ordinarily consists of two rows of perforations in staggered relation, as in Figs. 12 and 13. This arrangement is in the interest of conservation of space and in the obtaining of a suitable arrangement of reading fingers and their attachments. The reader fingers needed to sense such a "line" are also in two staggered rows. In consequence of this arrangement, the path along a "line" is a zigzag, alternating between the rows. A straight line arrangement could also be used.

Figure 6:
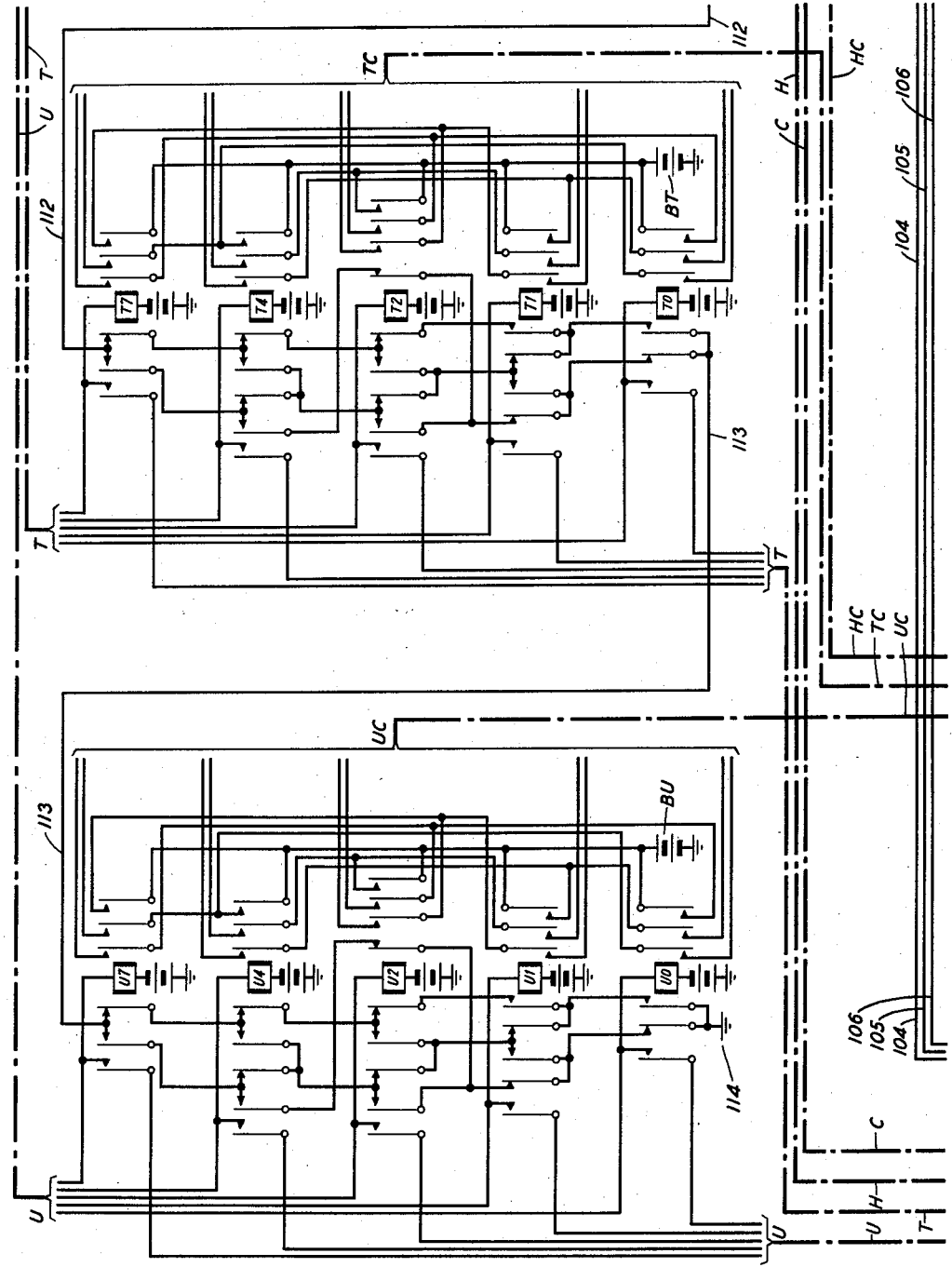
Figure 7:
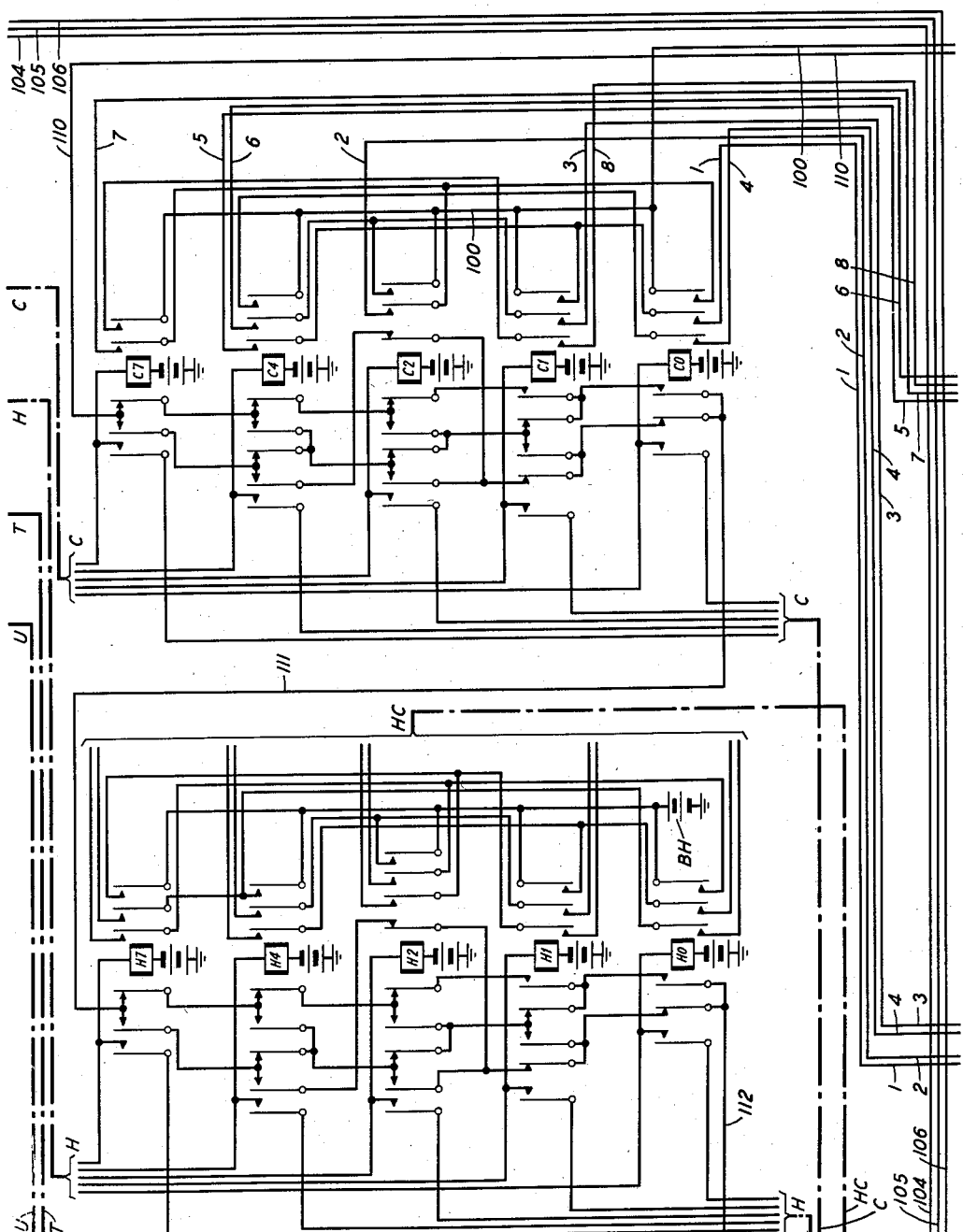

Since a 2-out-of-5 code is here used, the perforations are considered as in groups of five, one group for each of the contact groups U, T, H and C. The code elements of each group of five are designated as zero, 1, 2, 4, and 7, as shown on Fig. 12, and the combinations of two are additive except for zero, which is arbitrarily 4 and 7. Thus, as may be seen in the table Fig. 15, which shows the decimal equivalents of the code, 0–1 is 1, 1–2 is 3, 2–7 is 9, etc. Each reader group of five contacts is connected through a relay chain of five translating relays C0, C1, C2, C4 and C7 for the command group C, and like relays for the U, T and H groups (Figs. 6 and 7). The contacts of these relays are so interconnected that the system is self-checking. If more or less than two translating relays are operated in any group, the ground circuit to a normally operated checking relay CK (Fig. 10) is interrupted and an alarm is sounded.

The ground circuit for the checking relay CK is continuous through the translating relay groups C, H, T and U when two relays are operated in each group. The circuit is from ground through the battery BCK, through a contact of relay K to relay CK (Fig. 10) over lead 110 to the C translating relay group (Fig. 7); through this group to lead 111, the H group (Fig. 7); lead 112, the T group (Fig. 6); lead 113, the U group to ground at 114 (Fig. 6). The checking relay CK also maintains a normal ground connection on the operation or command group C, which connection is interrupted by the release of the CK relay, thus preventing false operation of the wiring machine. This connection is over the lead 100. These features will be explained in greater detail in connection with a discussion of circuit operation.

A discussion of self-checking codes of the type herein used is given in chapter 12 of "The Design of Switching Circuits" by Keister, Ritchie and Washburn, published by D. Van Nostrand Company, Inc., New York, New York. Reference to the particular 2-out-of-5 code is made under section 12–3, beginning on page 280.

Figure 8:
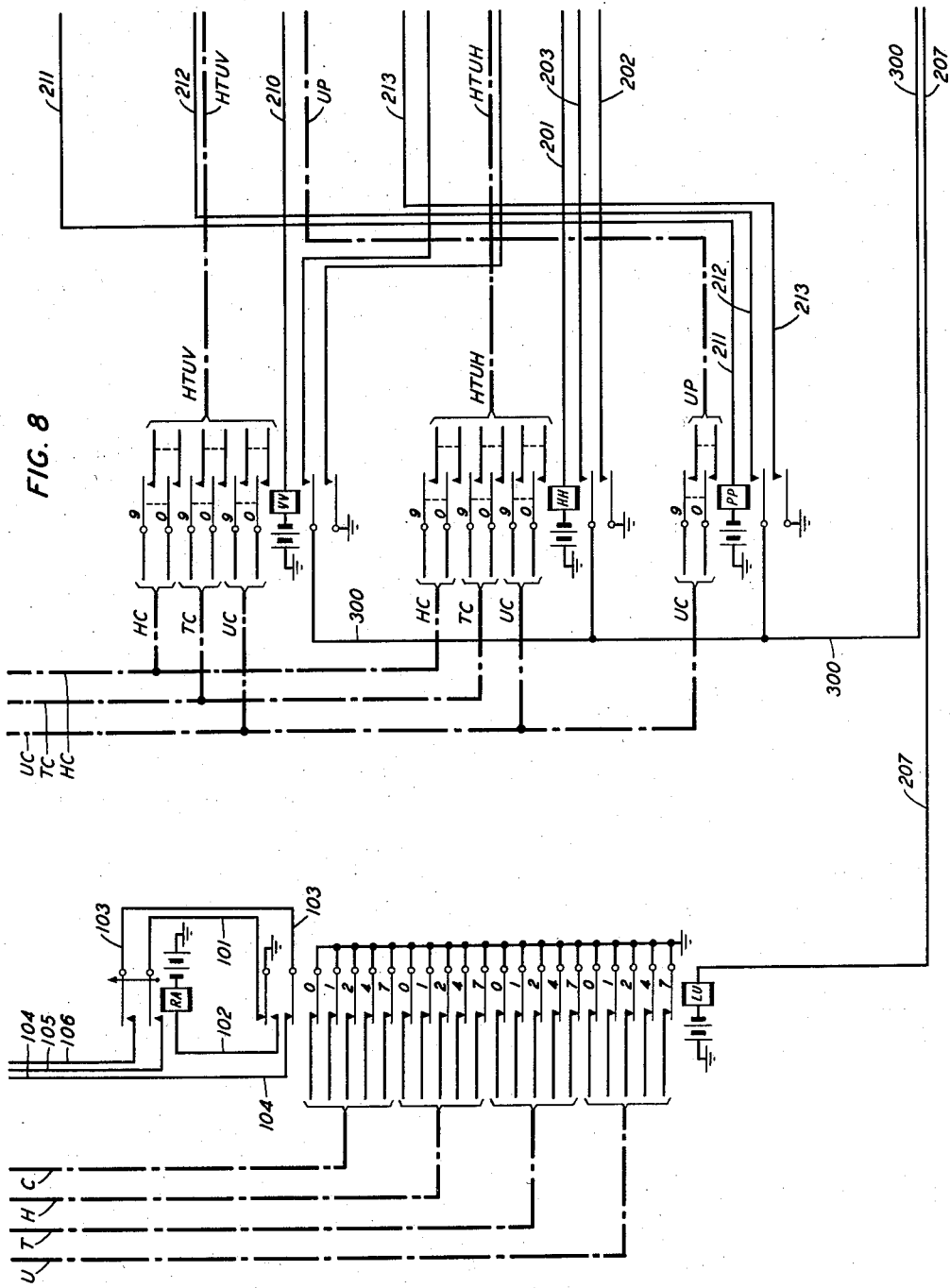
Figure 9:
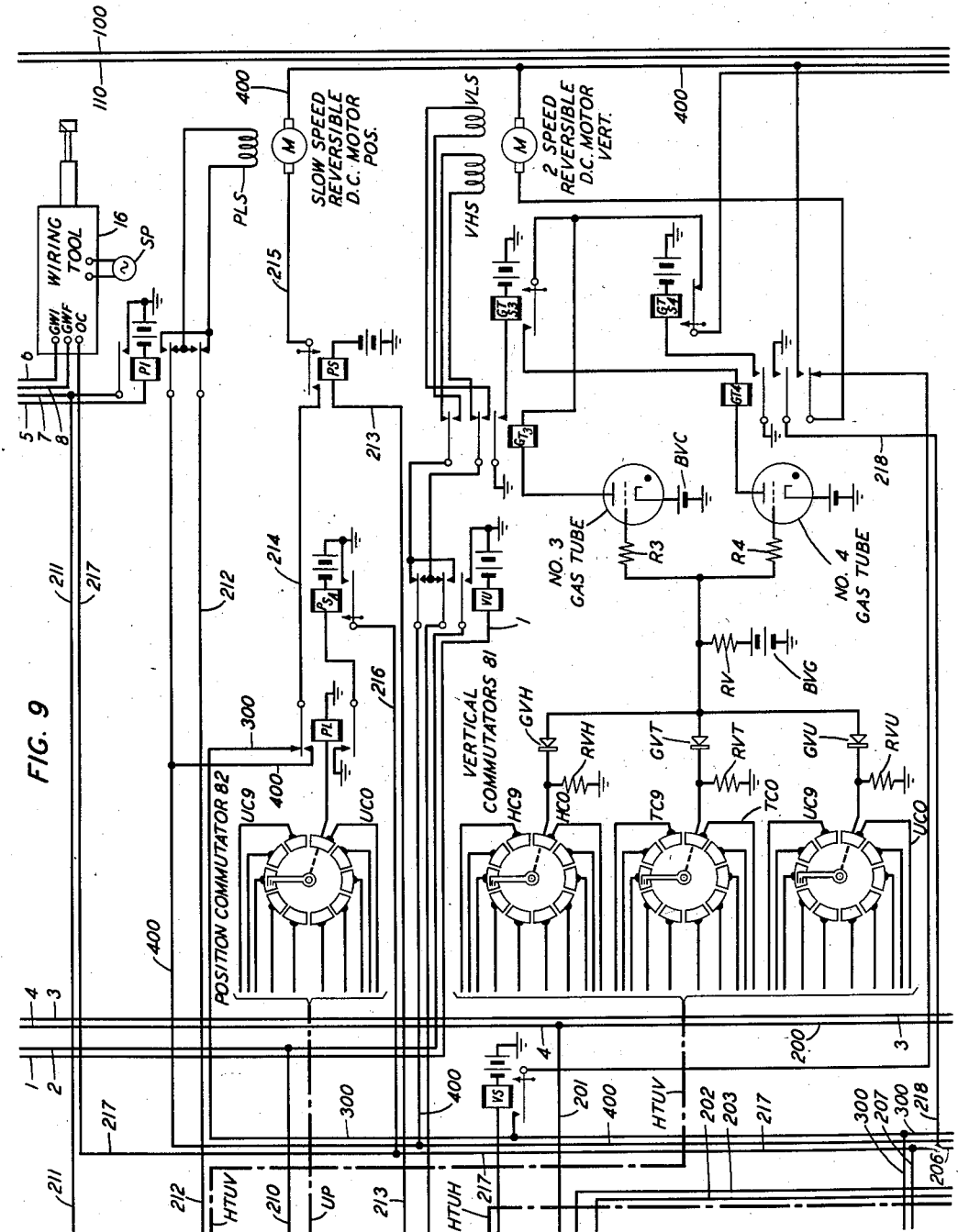

The code commands and position designations emanating from the reader of Fig. 5 are translated into decimal equivalents by the appropriate translating relay chains of Figs. 6 and 7, and are transmitted to the relays and control means of Figs. 8, 9 and 10, the figures being arranged in a diagram as shown in Fig. 11.

The operated translating relays are locked up through the normally closed contacts of the relay LU (Fig. 8). The position indications are passed through the contacts of the relays HH, VV, or PP (Fig. 8) to the appropriate commutators of Figs. 9 and 10.

The horizontal and vertical positioning motors Hor and Vert each have a high speed and a low speed field. These motors move the wiring tool at high speed to the commanded position at which point the high speed field is opened and the low speed field energized for the reverse direction. Due to inertia of the parts, the wiring tool overshoots and is returned to the exact location at low speed.

The high speed fields of the gun positioning motors and the low speed single field of the panel positioning motor are prepared as to direction by a command "Right" or "Left," "Up" or "Down," "In" or "Out" from the C group, as the case may be.

The armatures of the vertical and of the horizontal wiring tool positioning motors and of the panel positioning motor receive power through the contacts of slow operate relays VS, HS and PS (Figs. 9 and 10), respectively, which are operated as an indirect result of commands from the C group of translating relays.

A wiring machine of this type will, if desired, make connections between terminals by the shortest path, but where many connections are made the resulting random pile of wires is not usually desirable. Means may therefore be provided for assuring that the wires are laid in a suitable pattern. Since the wire wrapping tool is controlled in a system of rectangular coordinates, a logical pattern is one in which the wires are laid parallel to the axes of the coordinate system. In order to guide the wire at points where a change in direction occurs, some means for restraining the wire must be provided. This may be done in one way by inserting pegs in the panel at appropriate points, as determined by the wiring pattern for that panel. The pegs may be of the shape shown in Fig. 16 with an enlarged outer end to aid in retaining the wire or wires therearound.

Some examples of how these pegs may be used are shown in Fig. 17. A wire may be run from A to B by passing it around a peg at C. A wire may be run from D to E by passing it around pegs at F and G. (This circuitous route may be necessary because of other wires in the area between D and E.) A peg, such as the one at F, may be used to constrain several wires, for example the one from H to K as well as the one from D to E.

Although a series of operating instructions or commands may be recorded for the wiring tool or gun to start anywhere in the coordinate system, it is convenient to have a "home" position. This has been arbitrarily chosen here as at the upper lefthand corner of the panel. With the three-element, 10-unit commutators used, the wiring tool may be stopped at any of 999 positions horizontally or vertically. For convenience of description the horizontal positions may be designated as "h" positions and the vertical positions as "v" positions. The terminals are arranged on the apparatus and the apparatus on the panel so that all terminals will be at a vertical-horizontal intersection point in the coordinate system.

Suppose, taking a simple case, that a wire is to be run from a terminal at h632, v069 (considering the upper-left corner as h0, v0) to a terminal at h385, v069. Some of the necessary commands in such a sequence are shown on Fig. 13. The command "Right" according to the table Fig. 14 is the decimal digit 3. The code 1–2 therefore, has been punched on this line in the C group on the record. The code 2–4 in the hundreds group for 6, 1–3 in the tens group for 3, and 0–2 in the units group for 2 have also been punched to give the position h632. The wiring tool is moved horizontally to the position h632, v0 and stops. The record is stepped to the next "line" and the command "Down 069" is given. When the wiring tool arrives at h632, v069 it stops, the record is stepped, and a command "Panel in—position 008" may be given. The position number here will depend upon the length of the terminal, whether this is a first or later connection thereto, etc. With the panel in suitable position, the record is again stepped and gives a command "Gun wrap—initial end." After the wrap is completed, the record is again stepped to give a command "Panel out—position 001." When the panel is out the machine is ready to send the gun to the terminal at h385, v069. The command will be "Left 385" and since this is a straight, horizontal run, there being no vertical change, the next commands will be for panel positioning and wrapping.

It will be noted from Fig. 13 that the vertical position 69 is coded as 069 and that the panel positions 8 and 1 are coded respectively as 008 and 001. This is done to maintain continuity through the self-checking relay chain and to prevent operation of the checking and the alarm relays.

Where a run of wire is made with one or more right angle turns therein, the code will be set up so that the gun will pass the wire guiding and restraining pegs on the proper side to make the turn.

A detailed explanation of the control circuit as it operates to perform the functions required by the illustrative record of Fig. 13 will now be given. References are to Figs. 5 to 10, inclusive, arranged as in Fig. 11 and to Fig. 13. The system is prepared for operation by closing the switch S to operate the power control relay K. The contacts of the relay K connect the 110-volt direct current, the alarm devices, the battery BCK of the checking relay CK, the 110-volt alternating current for the reader motor, and the 200-volt anode power supply to the system.

The command of the first line (Fig. 13) is "Right 632". The reading fingers (Fig. 5) sense the punched holes as previously noted. The fingers 1 and 2 of the C group operate the translating relays C1 and C2 of Fig. 7 to supply the decimal digit 3, which as noted is the command "Right"; the fingers 2 and 4 of the H group supply the decimal digit 6; the fingers 1 and 2 of the T group supply the decimal digit 3; and the fingers zero and 2 of the U group supply the decimal digit 2 through the corresponding translating relays H, T, and U. The operated relays C, H, T and U are all locked up through their outside lefthand contacts and the closed contacts of the unoperated lock up relay LU (Fig. 8).

As previously noted there is a common lead 100 connected to all of the outside righthand contacts of the C group of translating relays (Fig. 5). This lead is connected to ground through the front contact of the normally operated checking relay CK (Fig. 10). The operation of the translating relays C1 and C2 (decimal digit 3) closes their serially connected contacts to connect the relay HR (Fig. 10) to the ground lead 100 over lead 3 to complete its operating circuit. The operation of the relay HR closes its top front contacts to prepare the high speed field HHS of the horizontal drive motor Hor for driving the wiring tool 16 (Fig. 9) to the right. The relay HR also closes a bottom contact to operate the relay HH (Fig. 8) over leads 200 and 201.

The operation of the relay HH closes its top contacts to complete a circuit from each of the translator batteries BH (Fig. 7), BT (Fig. 6), and BU (Fig. 6) to an appropriate segment of each section of the horizontal commutators 80 (Fig. 10). The circuit for the hundreds digit 6 is from battery BH through the righthand outer contacts of translating the relay H2, the righthand middle contacts of the relay H4, over HC to the 6 contact of the hundreds group of the relay HH, over HTUH to the 6 segment of the hundreds section of the horizontal commutators 80. The tens digit 3 and the units digit 2 are transmitted through similar circuits from the batteries BT and BU, respectively.

The operation of the relay HH also closes an outer bottom contact to complete the circuit of the slow operate relay HS (Fig. 10) over lead 202; and closes an inner bottom contact to apply power from the lead 300 of the 110-volt direct-current source, to the high speed field of the motor Hor over lead 203. The other 110-volt direct-current connection is over the common lead 400. After an interval due to the slow operation of the relay HS, its contacts close, to supply power from the lead 300 of the 110-volt direct-current source over the lead 204, back contact of the relay GT2, lead 205 to the armature of the motor Hor and to the common lead 400 to start this motor. The motor drives the wiring tool 16 to the right and at the same time the horizontal commutators. When the three rotary contactors simultaneously rest on the H6, T3, and U2 contacts, which are connected to the positive batteries BH, BT, and BU, as before noted, the No. 1 gas tube becomes conducting due to a resulting positive voltage on its grid. The No. 2 tube does not fire at this time because its anode circuit is open.

The gas tubes Nos. 1, 2, 3 and 4 become conducting when their grids are positive with respect to their cathodes. An explanation as to how a positive grid voltage is applied to one of these tubes, say No. 1, will suffice for all.

A battery BHG has its positive hole connected through the resistor RH and the grid resistor R1 to the grid of tube No. 1. The resistance of R1 is very high as compared with that of RH. The resistor RH is also connected through three branch circuits by way of the rectifiers GHH, GHT, and GHU to the respective rotors of the hundreds, tens and units sections of the horizontal commutators 80. The rectifiers are connected in the forward or conducting direction with respect to the battery BHG and each is connected to ground through the respective resistors RHH, RHT, and RHU. These three resistors are of much lower resistance than the resistor RH. With current flowing to ground through any rectifier and its associated resistor, the grid of tube No. 1 is almost at ground potential, and with respect to the cathode is negative, due to the cathode battery BHC. The gas tube is thus prevented from conducting as long as any of the three paths to ground is available. When each of the rotors of the horizontal commutators 80 is on a live segment, voltages from the batteries BH (Fig. 7), BT (Fig. 6), and BU (Fig. 6), that are equal and opposite to the voltage of the battery BHG, are impressed respectively upon all three rectifiers. Thus, current flow to ground is prevented and the grid of tube No. 1 receives a positive voltage and becomes conducting.

Conduction through tube No. 1 operates the relay GT1 which is in its anode circuit. The operation of the relay GT1 closes its two outer front contacts to transfer the field power supply from the high speed field winding HHS to the low speed field winding HLS of the motor Hor. The connections are such that the low speed field is connected to operate the motor Hor in a direction opposite to that for which the high speed field was connected. The inner front contact of GT1 is also closed to energize the slow operate relay GTS1, which closes the anode circuit of tube No. 2 after a suitable interval. The circuit is from the 200-volt D.-C. supply lead 500, contact of GTS2, lead 501, lead 503, contact of GTS1, lead 504 to relay GT2.

After overshooting, due to the inertia of the parts, the motor drives the wiring tool and the associated commutators slowly back to the selected position. When the energized commutator segments are again simultaneously connected to the grid circuits of the No. 1 and No. 2 tubes, the No. 2 tube becomes conducting. (The No. 1 tube is already conducting at this time.) The slow action of the relay GTS1 is to prevent conduction through the No. 2 tube until after the overshooting of the live commutator segments. The connection through the No. 2 tube operates the relay GT2 which is in its anode circuit.

The operation of the relay GT2 opens its outer back contacts to remove power from the armature of the motor HOR, and closes its outer front contacts to short-circuit this armature by transferring the lead 205 from the lead 204 to the lead 400; completes the circuit of slow operate relay GTS2 through its middle front contact; and completes the circuit of lock up relay LU (Fig. 8) over leads 206 and 207 to release the translator relays C1, C2, H2, H4, etc. The short circuiting of the armature aids in stopping the motor quickly. The operation of the relay GTS2 opens the anode circuit of both tubes by disconnecting lead 500 from lead 501 to release the relays GT1 and GT2, which in turn release the relays GTS1 and GTS2. The release of the relay GTS1 opens the anode circuit of tube No. 2 at this point. The release of the relay GTS2 recloses the anode circuit of the No. 1 tube via 500, 501 and 502. Due to the slow operation of the relay GTS2, the chain of operation is completed after the LU relay has released the translating relays, which remove battery from the commutator segments. Thus the No. 1 tube does not become conducting at this time.

The operation of the LU relay (Fig. 8), besides opening the lock up circuits for the translator relays, completes the operating circuit of the slow release relay RA by transferring ground from lead 101 to lead 102 (Fig. 8); and opens a contact between leads 103 and 104. These contacts and the RA relay and its contacts are involved with relays SL, LO, and magnet SC (Fig. 5) in the reader stepping operation to be later described.

Release of the translator relays opens the circuits of the relays HR, HH and HS, returning them to their normal unoperated condition.

The release of the relay GT2 releases the lock up relay LU by removing ground from lead 206, to restore the translator locking circuits for the next translator operation, and also de-energizes the relay RA. The release of the relay LU also restores the connection between the leads 103 and 104. During the slow release period of the relay RA, the reader is caused to advance one step. This completes the reading of one line of the punched tape record.

The wiring tool is now at h632, v0 and the next command (Fig. 13) is "Down 069." The command "Down" is represented by decimal digit 2 as indicated in the table Fig. 14. Since the high speed field of the vertical drive motor Vert is normally conditioned for downward movement of the carriage 17, this cycle is started by operation of the relay VV (Fig. 8) over leads 2 and 210. The chain of operations for the vertical movement is the same as for the previously described horizontal movement, the operation of the lock up relay LU at the end being from the relay GT4 (Fig. 9) over leads 218 and 207.

It may be here noted that if the command had been "Up" instead of "Down," the lead 1 representing the decimal digit 1 would have been connected to operate the relay VU (Fig. 9) to reverse the high speed field connection and to start the sequence.

The wiring tool now being at h632, v069, the next command is "Panel in—position 008." As has been noted, panel position 8 is the proper position for the particular terminal to receive the wrapped connection. For a different length terminal some other position digit would be used.

The command "Panel in" is represented by decimal digti 5 from the C group, and the operation starts with the energization of the relay PI (Fig. 9) over lead 5. Operation of the relay PI closes its lower front contacts to reverse the connection to the field PLS of the panel positioning motor POS. A top, front contact is also closed to operate the relay PP (Fig. 8) over lead 211. Operation of the relay PP closes its top contacts to transfer the position digit 008 to the position commutator (Fig. 9) over UP. Although the units translator relays are the only ones effective here, the hundreds and the tens groups are set up for zero to complete the self-checking relay chain. It is also advantageous to have perforations distributed across the record tape to improve the traction of the reader drum on the tape.

One bottom contact of operated relay PP closes the power circuit to the field of the motor POS from lead 300 over lead 212, the return being over lead 400, and the other operates the slow operate relay PS over lead 213 to close the armature circuit and start the motor. The armature circuit is over lead 300 from the 110-volt direct-current source, back contact of the relay PL, lead 214, contacts of the relay PS, lead 215 to the armature and back over the common lead 400 to the source. When the rotor of the positioning commutator finds the energized commutator segment 8, it operates the relay PL. The energization of the relay PL operates its transfer contacts to remove power from the armature of the motor POS and to short circuit it for quick stopping by disconnecting the lead 214 from the lead 300 and connecting it to the lead 400. Since the travel of the panel is short and relatively slow, no overshoot and return system is needed here.

The relay PL also grounds a bottom contact to operate the slow operate relay PSA, which in turn operates the lock up relay LU (Fig. 8) over leads 216, 217 and 207. The operation of the relay LU releases the translator relays and operates the slow release relay RA. The release of the translator relays releases the relays PI, PP, PS, PL, PSA, and LU and de-energizes the relay RA. The slow release of RA and the reclosing of the contacts between conductors 103 and 104 by the release of LU operates the reader stepping means in a manner to be described.

The next command on the record tape (Fig. 13) is "Gun wrap—initial end." The command from the C translator relay is 6 in accordance with the table Fig. 14. The lead 6 for the command 6 connects to the wiring tool 16 at GWI. The tool, which is now in wrapping relation to the appropriate terminal, makes a wrapped connection on this terminal with the initial end of the wire. When the wrapping cycle is completed, the wiring tool momentarily closes a ground circuit from OC to the relay LU over leads 217 and 207 to release the translator relays and set up the reader stepping cycle via the relay RA as in the other operations. The closure at OC is of very short duration, so the relay LU releases and the reader is stepped.

The next command is "Panel out—position 001." The command digit is 7 (Fig. 14) and it goes directly to relay PP (Fig. 8) over leads 7 and 211, since the bottom back contacts of de-energized relay PI are closed to prepare the field of the motor POS for an outward movement of the panel. The operation is otherwise like the "Panel in" operation, ending with a stepping of the reader to the next command, which according to Fig. 13 is "Left 385."

The execution of the command "Left 247" is carried out in the same manner as the previously described execution of the command "Right 632" except that the decimal digit 4 (Left in the table Fig. 14) is transmitted directly to the relay HH (Fig. 8) over the leads 4 and 201 to start the sequence. The transfer contacts of the relay HR are already in condition for lefthand operation of the motor Hor. The wiring tool while traveling pays out the wire which is already connected to the first terminal.

Upon stopping of the wiring tool at the required coordinate position h385, v069, the reader is stepped to next give the command "Panel in—position 008". When the panel is positioned, the command is "Gun wrap—final end". The command digit is 8 (Fig. 14) and goes to GWF on the tool 16 via the lead 8. This wrapping operation comprises cutting the wire to length, stripping the insulation from the part to be wrapped, and wrapping the connection. A momentary operation of the relay LU is caused at the completion of the wrapping operation from OC via leads 217 and 207 and the record is stepped to the final command of this cycle, i. e., "Panel out—position 001". At the end of this operation the reader is stepped to initiate another series of operations to interconnect two more terminals.

The record may be set up to continue until all of the required connections are made and then given an alarm. This could be done by making the line after the last required command with too many or too few perforations in any translator group, so as to operate the checking relay and give an alarm. Another way would be to command the wiring tool to go to a "Home" position h0, v0 in accordance with the exemplary operation discussed and operate a switch (not shown) mechanically to terminate the operations and give an alarm.

As has been indicated in connection with each of the various operations, the lock up relay LU is energized at the completion of each operation. This energization releases the translating relays, energizes the slow release relay RA, and opens the normally closed contacts interconnecting leads 103 and 104. This energization is of short duration either due to a relay release sequence started by release of the translator relays in the case of horizontal, vertical, or panel position controls; or due to a short operating pulse at the end of wiring tool operations. Due to the release of LU, the leads 103 and 104 are reconnected and RA is deenergized. Due to the slow release of RA, the lead 106 remains connected to the lead 103 and thus to the lead 104. The release time of the relay RA, although short, is long enough to overlap the closing of the contacts P by the cam 71 (Fig. 5). This completes a circuit from ground through contacts P, lead 104, the then closed contacts of the relay LU, lead 103, the then closed contacts of the relay RA, lead 106, back contact of the then de-energized relay LO (Fig. 5) through the relay SL (Fig. 5) to battery, operating the relay SL.

The closure of the top front contacts of the relay SL puts this same ground on the step control or interposer magnet SC through lead 109 to complete the circuit for this magnet from the battery BS. The operation of the magnet SC releases the driving pawl 56 to allow it to step the reader, when cam 60 is in a position to allow the spring 59 to advance the pawl 56.

The J1 and J2 contacts are closed by the cam 72 shortly after the P contacts close and before the relay RA releases. Closure of the contacts J2 connects lead 108 to ground, which locks up the relay SL and the step control magnet SC. The J1 contacts put ground on the lock out relay LO through lead 107 and the then closed bottom contacts of the relay SL. Because of the slow release of the relay RA, the relay LO locks up through its own righthand contact, conductor 105, the now closed front contacts of the relay RA, lead 101, and through the now closed back contacts of the LU transfer contacts to ground.

The cam 70 raises the reader fingers before the cam 60 is positioned for stepping, but while the J1 and J2 contacts are still closed. The stepping is then started and the J contacts open. Opening of the J2 contacts releases the relay SL and the step control magnet SC. Due to the release of the magnet SC, the pawl 56, when retracted, is locked in the inoperative condition by the hook 68 on the member 66.

Opening of the contacts J1 opens the initiating circuit to the relay LO, by removing ground from lead 107; LO releases if its locking circuit through the contacts of relay RA, i. e. between leads 106 and 103, is then open, or if not, when relay RA completes its slow release. The purpose of the lock out relay LO is to maintain a break, at its back contacts, in the initiating circuit of the relay SL and the magnet SC to insure that only one step is made after each command. A second closure of the contacts P before the release of the relay RA was completed would set up the initiating circuit again if the relay LO were not locked up through a front contact of the relay RA. However, after the relay RA releases, the iniating circuit is broken at its outer front contact, i. e. between leads 103 and 106, and there is no further need for the relay LO to perform its function.

The checking relay CK (Fig. 10) has back contacts so that when it is released, ground is transferred from the ground lead 100 of the C translating relay group to the alarm relay AR. Operation of the alarm relay will ring the bell BL and light the lamp LP to notify the operator. Since the checking relay CK is released for a fraction of a second during each stepping operation, the relay AR is made sufficiently slow in operation to avoid giving an alarm during this short period. If the relay CK stays released because of a fault, however, the relay AR will operate to give the alarm.

The cams 60, 70, 71 and 72 (Fig. 5), which are continuously operated by the motor 62 are arranged to perform their functions in accordance with the time diagram of Fig. 18. The complete circle of this diagram represents one rotation of the cams. The diagram is in terms of the functions performed. The rotation is taken as counter-clockwise and for purpose of explanation is considered with respect to the middle of the stepping period, i. e., the time during which the cam 60 allows the unlatched pawl 56 to advance the roller 51. First, the reading fingers 53 are lowered to the "In" position, then the P contacts close followed shortly by closure of the J contacts. Toward the other end of the cycle, the P contacts first open, the reading fingers are lifted to the "Out" position, the stepping operation starts, and finally the J contacts are opened. The operation of the contacts and the fingers occurs once every cycle but the stepping occurs only when allowed by the step control magnet SC.

The wiring tool or gun 16, which, as previously indicated, may be like the one described in the previously noted patent of J. J. Madden, is provided with a motor and suitable means for initiating and terminating a wire wrapping operation and for signaling the termination of the operation by a momentary operation of the LU relay (Fig. 8). The designations on the wire wrapping tool 16, as illustrated in Fig. 9, relate to connections for such means. When the initial end of a wire is to be wrapped on a terminal, the connection is to GWI (Gun Wrap— Initial End). For the wrapping of the final end of the wire, the connection is to GWF (Gun Wrap—Final End). These connections may be to magnets or solenoids arranged to close a switch for an initial or a final end wrap. After each wrap is completed, the lead 217 connected at OC (Operation Completed) may be momentarily grounded to operate the LU relay, by some moving part such as a cam on the wrapping mechanism. The wiring tool may receive power from any convenient source such as the Power Source (SP).

What is claimed is:

1. A machine for making electrical connections between selected terminals of an array of panel mounted terminals, that comprises a base, a wiring tool; a wiring tool positioning means, and a panel positioning means, both of said means being mounted on said base; and control means associated with the wiring tool and with the positioning means; the wiring tool including motor means and means operated by the motor means for sequentially connecting the respective ends of a wire to selected terminals; the wiring tool positioning means including a frame fixed to the base, a wiring tool carriage mounted on the frame, means for vertically moving said carriage, means for horizontally moving the tool along the carriage, and motor means for each of said moving means; the panel positioning means including a panel support, means for moving the support toward and from the wiring tool, and motor means; the control means including a record of commands for operations to be performed, means for reading said record, means for translating the readings into commands, and means for transmitting the commands to appropriate ones of said motor means for effectuating the commands.

2. A machine for making electrical connections between selected terminals of an array of mounted terminals, that comprises a base, a wiring tool, a wiring tool positioning means, and a terminal positioning means, both mounted on said base; and control means associated with the wiring tool and with the positioning means; the wiring tool including motor means and means operated by the motor means for connecting the respective ends of a wire to selected terminals; the wiring tool positioning means including a frame, a wiring tool carriage mounted on the frame, means for vertically moving said carriage, means for horizontally moving the tool along the carriage, and motor means for each of said moving means; the terminal positioning means including a support, means for moving the support relative to the wiring tool, and motor means; the control means including a record of operations to be performed, means for reading said record, means for translating the readings into commands, and means for transmitting the commands to appropriate ones of said motor means for effectuating the operations.

3. A machine for making electrical connections between selected terminals, that comprises a wiring tool, a wiring tool positioning means, a terminal positioning means, and control means associated with the wiring tool and with the positioning means; the wiring tool including means for connecting the respective ends of a wire to selected terminals; the wiring tool positioning means including a frame, a wiring tool carriage mounted on the frame, means for vertically moving said carriage, means for horizontally moving the tool along the carriage, the terminal positioning means including a support, means for moving the support with respect to the wiring tool; and motor means for each positioning means and the wiring tool; the control means including a record of commands for operations to be performed, means for reading said record, means for translating the readings into commands, and means for transmitting the commands to appropriate ones of said motor means for effectuating said commands.

4. A machine for making electrical connections between selected terminals of an array of terminals, that comprises a base, a wiring tool, a wiring tool positioning means, and a terminal positioning means, both mounted on said base; and control means associated with the wiring tool and with the positioning means; the wiring tool including means for connecting the ends of a wire to selected terminals; the wiring tool positioning means including a frame fixed to the base, a wiring tool carriage mounted on the frame, means for vertically moving said carriage, means for horizontally moving the tool along the carriage, the terminal positioning means including a support, and means for moving the support toward and from the wiring tool; the control means including a record of commands for operations to be performed, means for reading said record, means for translating the readings into commands, and means for selectively transmitting the commands to appropriate positioning means or to the wiring tool for effectuating the commands.

5. A machine for making electrical connections between selected terminals of an array of panel mounted terminals, that comprises a wiring tool, a wiring tool positioning means, a panel positioning means, and control means associated with the wiring tool and with the positioning means; the wiring tool including motor means and means operated by the motor means for sequentially connecting the respective ends of a wire to selected terminals; the wiring tool positioning means including a frame, a wiring tool carriage on the frame, means for vertically moving said carriage, means for horizontally moving the tool along the carriage, and motor means for each of said moving means; the panel positioning means including a panel support, means for moving the support toward and from the wiring tool, and motor means; the control means including a record of commands for operations to be performed, means for reading said record, means for translating the readings into commands, and means for transmitting the commands to appropriate ones of said motor means for effectuating the operations.

6. A wiring machine for interconnecting selected terminals of an array of terminals of mounted apparatus elements, said terminals being in parallel relation to each other and all projecting from substantially the same plane, said machine comprising a base, a frame secured to said base, a carriage mounted for vertical movement on said frame, a wiring tool mounted for horizontal movement on said carriage, a vertical movement motor on said base and power transmitting means for connecting said motor to said carriage, a horizontal movement motor on said base and power transmitting means for connecting said motor to said wiring tool, a motor on said wiring tool and means for connecting said motor to wire handling elements of the tool, an apparatus support mounted for reciprocable movement on said base, toward and from the wiring tool, an apparatus positioning motor on said base and means for connecting said motor to said apparatus support, position responsive means connected for operation by each of the vertical movement, horizontal movement, and apparatus positioning motors; and means for selectively controlling each of the motors in conformance with a wiring program and comprising a program record including successive increments of information, a record sensing means, means for transmitting increments of sensed record information to an appropriate positioning motor for starting said motor, means conditioned by sensed record information including the position responsive means, for stopping each positioning motor, means for transmitting increments of sensed record information to the wiring tool motor for starting the wiring tool motor, means included in the wiring tool for stopping the wiring tool motor; and means associated with each motor, operable at the end of the motor's performance in accordance with received record information, for conditioning the control means for the sensing of the next increment of information.

7. A wiring machine for interconnecting selected terminals of an array of terminals, said machine comprising a base, a frame secured to said base, a carriage mounted for vertical movement on said frame, a wiring tool mounted for horizontal movement on said carriage, a vertical movement motor and means for connecting said motor to said carriage, a horizontal movement motor and means for connecting said motor to said wiring tool, a motor on said wiring tool and means for connecting said motor to wire handling elements of the tool, a terminal support mounted for movement on said base, toward and from the wiring tool, a terminal positioning motor and means for connecting said motor to said support, position responsive means connected for operation by each of the vertical movement, horizontal movement, and apparatus positioning motors, means for selectively controlling each of the motors in conformance with a wiring program and comprising a program record including successive increments of information, a record sensing means, means for transmitting increments of sensed record information to an appropriate positioning motor for starting said motor, means conditioned by sensed record information including the position responsive means, for stopping each positioning motor, means for transmitting increments of sensed record information to the wiring tool motor for starting the wiring tool motor, means included in the wiring tool for stopping the wiring tool motor; and means associated with each motor, operable at the end of the motor's performance in accordance with the received record information for conditioning the control means for the sensing of the next increment of information.

8. A wiring machine for interconnecting selected terminals, said machine comprising a base, a frame secured to said base, a carriage mounted for vertical movement on said frame, a wiring tool mounted for horizontal movement on said carriage, a vertical movement motor and means for connecting said motor to said carriage, a horizontal movement motor and means for connecting said motor to said wiring tool, a motor on said wiring tool and means for connecting said motor to wire handling elements of the tool, a terminal support mounted for movement on said base, toward and from the wiring tool, a terminal positioning motor and means connecting said motor to said terminal support, position responsive means connected for operation by each of the vertical movement, horizontal movement, and apparatus positioning motors, means for selectively controlling each of the motors in conformance with a wiring program and comprising a program record, a record sensing means, means for transmitting increments of sensed record information to an appropriate positioning motor, including the position responsive means, for controlling each positioning motor, means for transmitting increments of sensed record information to the wiring tool motor, and cooperating means included in the wiring tool for controlling the wiring tool motor; and means associated with each motor, for conditioning the control means for the sensing of the next increment of information.

9. A wiring machine for interconnecting selected terminals of mounted apparatus elements, said machine comprising a base, a frame secured to said base, a carriage mounted for vertical movement on said frame, a wiring tool mounted for horizontal movement on said carriage, a motor and means for connecting said motor to said carriage, another motor and means for connecting said other motor to said wiring tool, a motor on said wiring tool, an apparatus support mounted for reciprocable movement on said base, an apparatus positioning motor and means for connecting said motor to said apparatus support, position responsive means connected for operation by each of the positioning motors, means for selectively controlling each of the motors in conformance with a wiring program and comprising a program record, a record sensing means, means for transmitting sensed record information to an appropriate positioning motor, including the position responsive means, for controlling each positioning motor, means for transmitting sensed record information to the wiring tool motor, and cooperating means included in the wiring tool for controlling the wiring tool motor; and means associated with each motor, operable at the end of the motor's performance, for conditioning the control means for the sensing of further recorded information.

10. A wiring machine for interconnecting selected terminals of an array of terminals of mounted apparatus elements, said machine comprising a base, a frame secured to said base, a carriage mounted for vertical movement on said frame, a wiring tool mounted for horizontal movement on said carriage, a vertical movement motor on said base and means for connecting said motor to said carriage, a horizontal movement motor on said base and means for connecting said motor to said wiring tool, a motor on said wiring tool and means for connecting said motor to wire handling elements of the tool, an apparatus support mounted for reciprocable movement on said base, an apparatus positioning motor on said base and means for connecting said motor to said apparatus support, position responsive means connected for operation by each of the vertical movement, horizontal movement, and apparatus positioning motors and means for selectively controlling each of the motors in conformance with a wiring program and comprising a program record including successive increments of information, a record sensing means, means for transmitting increments of sensed record information to an appropriate positioning motor, including the position responsive means, for controlling each positioning motor; means for transmitting increments of sensed record information to the wiring tool motor, and cooperating means included in the wiring tool for controlling the wiring tool motor; and means associated with each motor, operable at the end of the motor's performance for conditioning the control means for the sensing of the next increment of information.

11. A wiring machine for interconnecting selected terminals of an array of terminals of mounted apparatus elements, said machine comprising a base, a frame secured to said base, a carriage mounted for vertical movement on said frame, a wiring tool mounted for horizontal movement on said carriage, a vertical movement motor on said base and means for connecting said motor to said carriage, a horizontal movement motor on said base and means for connecting said motor to said wiring tool, a motor on said wiring tool and means for connecting said motor to wire handling elements of the tool, an apparatus support mounted for reciprocable movement on said base, an apparatus positioning motor on said base and means for connecting said motor to said apparatus support, and means for selectively controlling each of the motors in conformance with a wiring program and comprising a program record, a record sensing means, means or transmitting increments of sensed record information to an appropriate motor, and means associated with each motor, for conditioning the control means for the sensing of the next increment of information.

References Cited in the file of this patent

UNITED STATES PATENTS

| | | |
|---|---|---|
| 1,677,133 | Ford | July 17, 1928 |
| 1,823,680 | Curtis | Sept. 15, 1931 |
| 2,029,335 | Oberhoffken | Feb. 4, 1936 |
| 2,035,658 | Lewis | Mar. 31, 1936 |
| 2,438,098 | Tandler | Mar. 6, 1948 |
| 2,537,770 | Livingston | Jan. 7, 1951 |
| 2,551,358 | Andren | May 1, 1951 |
| 2,637,096 | Luhn | May 5, 1953 |
| 2,649,121 | Reck | Aug. 18, 1953 |
| 2,736,852 | Nelson | Feb. 28, 1956 |
| 2,748,665 | Senn | June 5, 1956 |